May 22, 1934.  M. H. ACKERMAN  1,960,074
APPARATUS FOR COOLING OR FREEZING
Filed Sept. 28, 1931  4 Sheets-Sheet 1

INVENTOR.
Michael H. Ackerman
BY Geo. B Pitts
ATTORNEY.

May 22, 1934.  M. H. ACKERMAN  1,960,074

APPARATUS FOR COOLING OR FREEZING

Filed Sept. 28, 1931  4 Sheets-Sheet 4

INVENTOR.
Michael H. Ackerman
BY
Geo. B. Pitts
ATTORNEY.

Patented May 22, 1934

1,960,074

UNITED STATES PATENT OFFICE 1,960,074

APPARATUS FOR COOLING OR FREEZING

Michael Henry Ackerman, Mansfield, Ohio, assignor to The H. H. Miller Industries Company, Canton, Ohio, a corporation of Ohio Application September 28, 1931, Serial No. 565,425

29 Claims. (Cl. 62—114)

This invention relates to apparatus for applying liquid ammonia to the walls of a container for liquids or semi-liquids for cooling or freezing the latter as desired. In the use of the term container I comprehend pasteurizers, holding vats, cooling apparatus, and freezing mechanisms, in which the material is held for a predetermined or indefinite period, and conduits through which the liquid to be cooled may be circulated.

In the present disclosure, the invention is applied to a freezing mechanism of the continuous batch type and process of controlling the refrigerant during freezing and whipping of each batch of material. The freezing mechanism is adapted to freeze cream and other materials, usually termed "mixes", whereby ice cream, ices and similar products may be produced.

One object of the invention is to provide for the direct application of a volatile liquid refrigerant circulated by mechanical means to eliminate thermal siphon activity and to cause the flow of the refrigerant over and in continuous intimate contact with the walls of the material holding container, whereby the freezing time is reduced, various equipment are eliminated, and the refrigerant during the freezing and whipping steps is adequately controlled, and storage of the refrigerant during whipping and between batch freezing operations is provided for without attendant danger of explosions.

Another object of the invention is to provide a simplified construction in which external equipment is eliminated, thereby reducing waste of refrigerant capacity due to icing or frosting thereof.

Another object of the invention is to provide an improved mechanism of the above character in which the liquid ammonia is continuously and uniformly circulated during freezing over all portions of the container walls, whereby the cooling or freezing operation is positively controlled without loss of time.

Another object of the invention is to provide an apparatus in which provision is made for applying liquid ammonia to the walls of a container in a closed chamber without depending on a thermal circulation of the liquid ammonia into and out thereof.

Another object of the invention is to provide a mechanism of the above character in which liquid ammonia is supplied by mechanical means to the upper portion of the container and allowed to flow over the walls thereof, whereby refrigeration is substantially instantly and uniformly applied to the entire container wall for refrigerating the material and its supply instantly cut off at the end of the refrigerating step.

Another object of the invention is to provide a freezing mechanism in which ammonia in a liquid state is caused to circulate over the walls of the material holding container, whereby gas pockets are eliminated and more uniform contact of ammonia with such walls results.

Another object of the invention is to provide in a freezing mechanism in which liquid ammonia is utilized as a refrigerant and provision is made for circulating the liquid ammonia, improved means for preventing leakage.

Another object of the invention is to so mount the reservoir for the liquid ammonia and float chamber and associated parts that they may be suitably insulated, thereby insuring sanitary conditions and eliminating waste of the liquid ammonia by gasification.

Another object of the invention is to provide a mechanism of the above character in which liquid ammonia is supplied to the upper portion of the container and allowed to gravitate over the walls thereof, thereby simplifying the construction and operation, eliminating control valves and avoiding all danger of explosions.

Another object of the invention is to provide an improved process of controlling the refrigerant for freezing batches of material, whereby successive batches may be frozen in minimum time.

Other objects of the invention will be apparent to those skilled in the art to which my invention relates from the following description taken in connection with the accompanying drawings, wherein Fig. 1 is a plan view of a freezing mechanism embodying my invention.

Fig. 4 is a fragmentary section on the line 4—4 of Fig. 2, the agitating mechanism being shown in end elevation.

Fig. 8 is a transverse section through the distributor.

Figure 1:
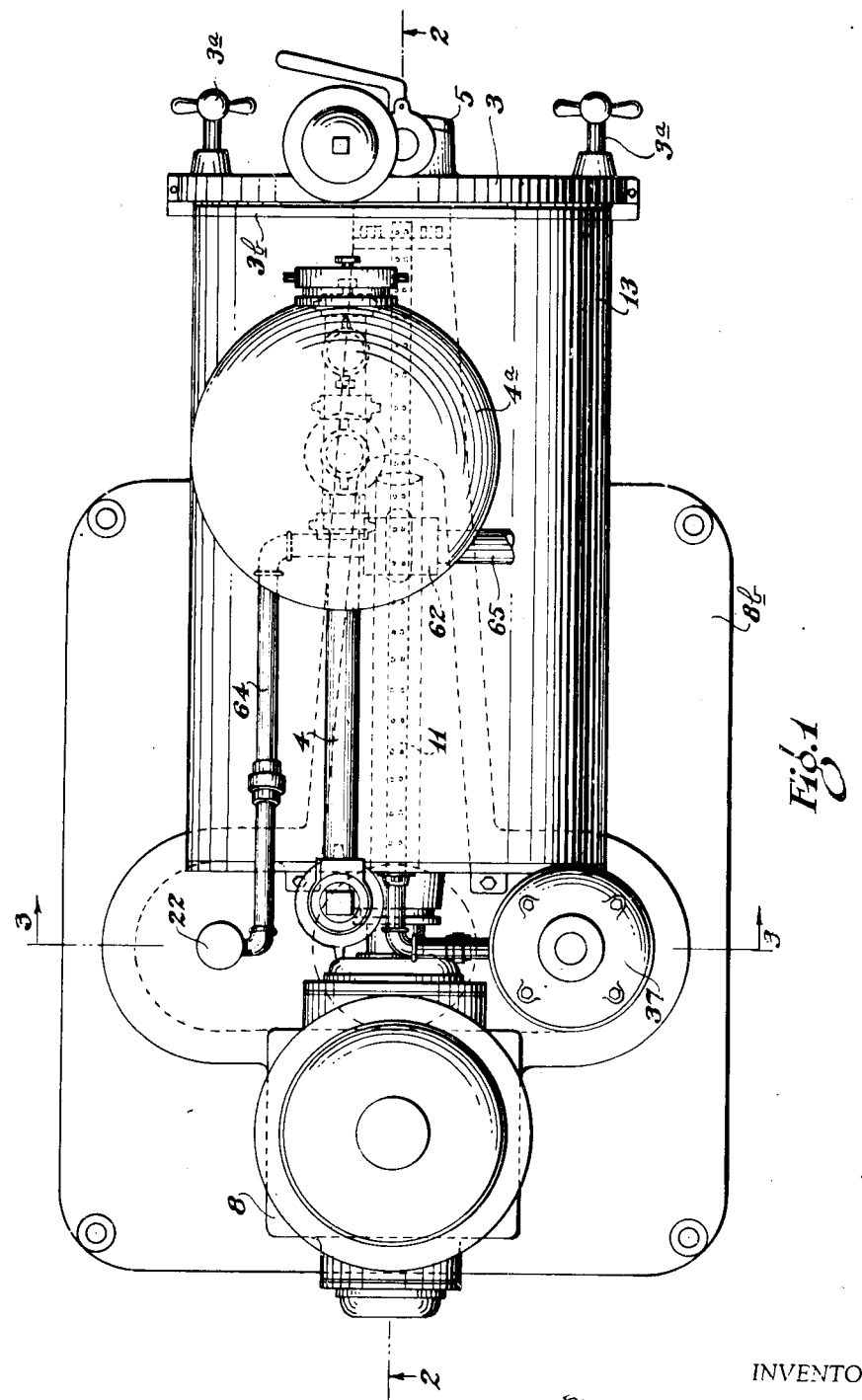

In the drawings, 1 indicates a container for the material, such container being shown as a cylinder in which batches of material are successively frozen, the cylinder being closed in a liquid tight manner at its rear end by a rear head 2 and having a removable front head 3. As will later be understood, the container constitutes an evaporator since the heat of the material therein is transferred through the walls of the container cylinder. The cylinder 1 is preferably formed from a single wall of material approximately ⅜"
in thickness, the wall having a nickel inner portion and steel outer portion, these materials being rolled together into integral relation. The nickel portion serves as a wall having characteristics suitable for holding mixes and the steel portion serves to impart strength to the wall to resist external pressure. The rear head 2 is provided with an inlet duct 2a connected with a valve controlled supply pipe 4 leading from a suitable measuring tank 4a. The front head 3 is provided with a valve controlled outlet 5. The head 3 may be constructed as shown in Letters Patent No. 1,449,623, granted to Leroy S. Pfouts. The head 3 is secured in position by detachable elements 3a to a ring 3b, which is secured in a gas and liquid tight manner to the front end of the cylinder 1. The ring 3b and head 3a are provided with ground inter-engaging seats so that when the latter is secured in position the cylinder 1 is sealed against leakage. 6 indicates an agitating and ejecting mechanism within the cylinder 1 and preferably comprising inner and outer rotatable members, the outer member carrying suitable scrapers 7 and one or more ejecting elements 7a and the inner member carrying propelling blades 7b. The agitating and ejecting mechanism is preferably constructed similar to that shown in Letters Patent No. 1,692,964. The rotatable agitating members are connected to two shafts, respectively, which extend through the rear head 2 and are driven in a well known manner by a suitable driving mechanism 8.

The driving mechanism is suitably mounted on a bed 8a, which forms an integral part of a base 8b, arranged to support the freezing cylinder as later set forth. The driving means 8 shown herein consists of an electric motor 8' the shaft of which operates through suitable reduction gearing, within the casing 8x, to drive gears within the gear box 8x'. The base 8b is preferably hollow for manufacturing purposes and to provide space for parts hereinafter referred to. The upper portion of the base 8b is elongated and provided with a forward extension 8b'. The extension 8b' has a top wall 8c. Between the top wall and bed 8a, the base is open to receive the parts to be referred to, certain of which extend upwardly beyond the base. The bottom of the base 8b is also open to permit assembly of these parts therethrough when desired.

Figure 2:
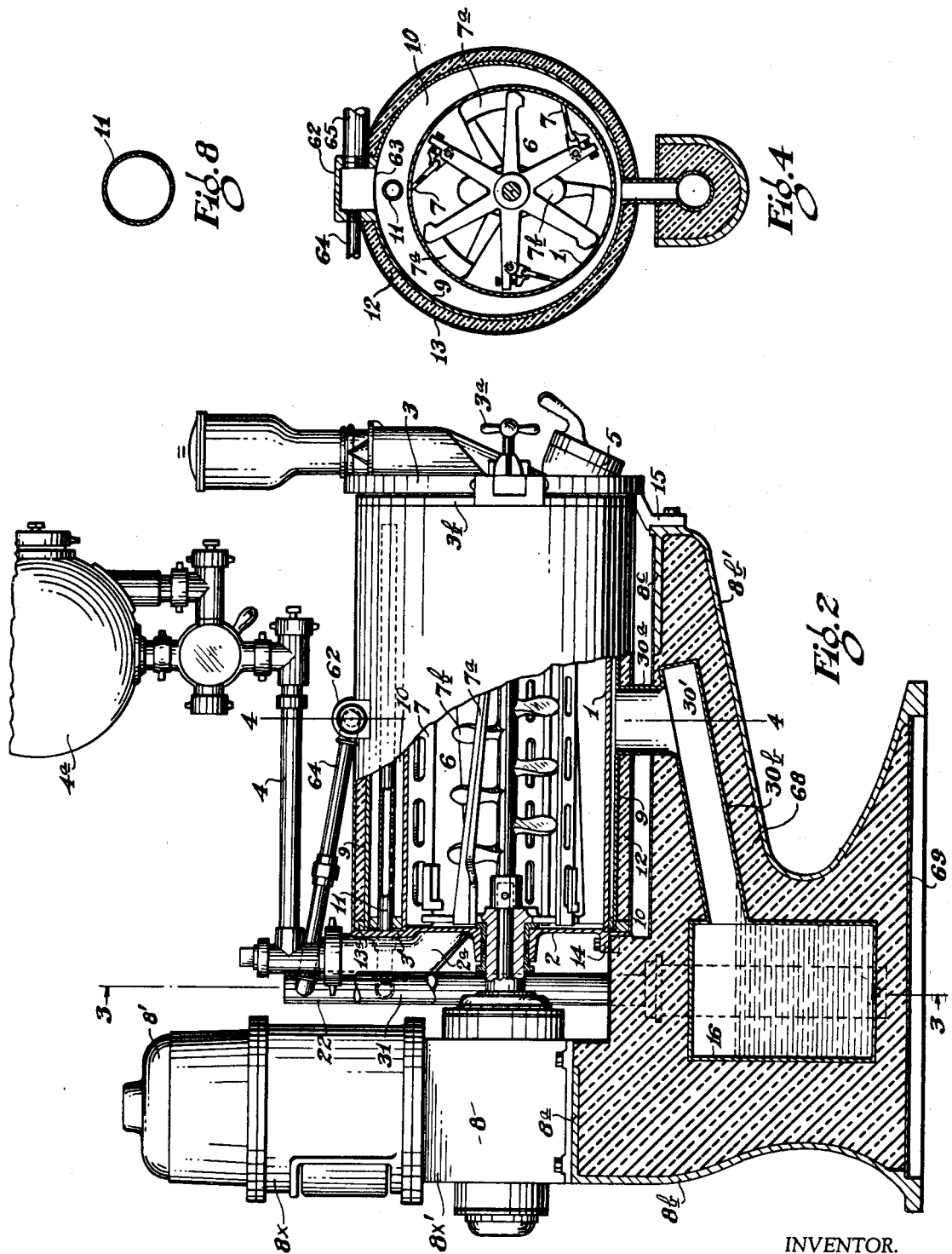
Fig. 2 is a side elevation, with parts broken away.

9 indicates a cylinder surrounding the cylinder 1 and spaced therefrom, the cylinders being closed in a gas and liquid tight manner at their rear and front ends by rings 3' (one being shown in Fig. 2), thereby forming entirely around the cylinder a chamber or space 10 into which the liquid ammonia is discharged by a distributor 11, to be later referred to. The cylinder 1 and cylinder 9 are eccentrically related to provide in the space 10, above the cylinder 1, ample room for the distributor 11. The space 10 also provides adequate space for the gases, which are generated by reason of the ammonia flowing over the walls of the container, especially where the temperature of the "mix" in the container is relatively high, for instance, when a new batch of "mix" is introduced into the cylinder 1. The enlarged space also provides room in which the liquid and gas may become separated, thereby permitting the gas to rise above the cylinder 1, so that dry gas will be sucked through the pipe (hereinafter referred to) leading to the compressor and the liquid will flow or gravitate over the walls of the cylinder 1. The outer wall of the cylinder 9 is suitably insulated with a jacket of cork or other non-heat conducting material 12, such jacket being enclosed by a casing 13. The casing 13 is preferably closed at its ends by a ring 13a.

The rear head 2 is provided with spaced lugs 14, which are secured to inturned flanges on the base 8b, and the ring 3b is provided with a depending bracket 15 which is secured to the extension 8b'. As shown, the lugs 14 and bracket 15 serve to support the cylinder 1 and parts associated therewith on the base 8b.

Figure 3:
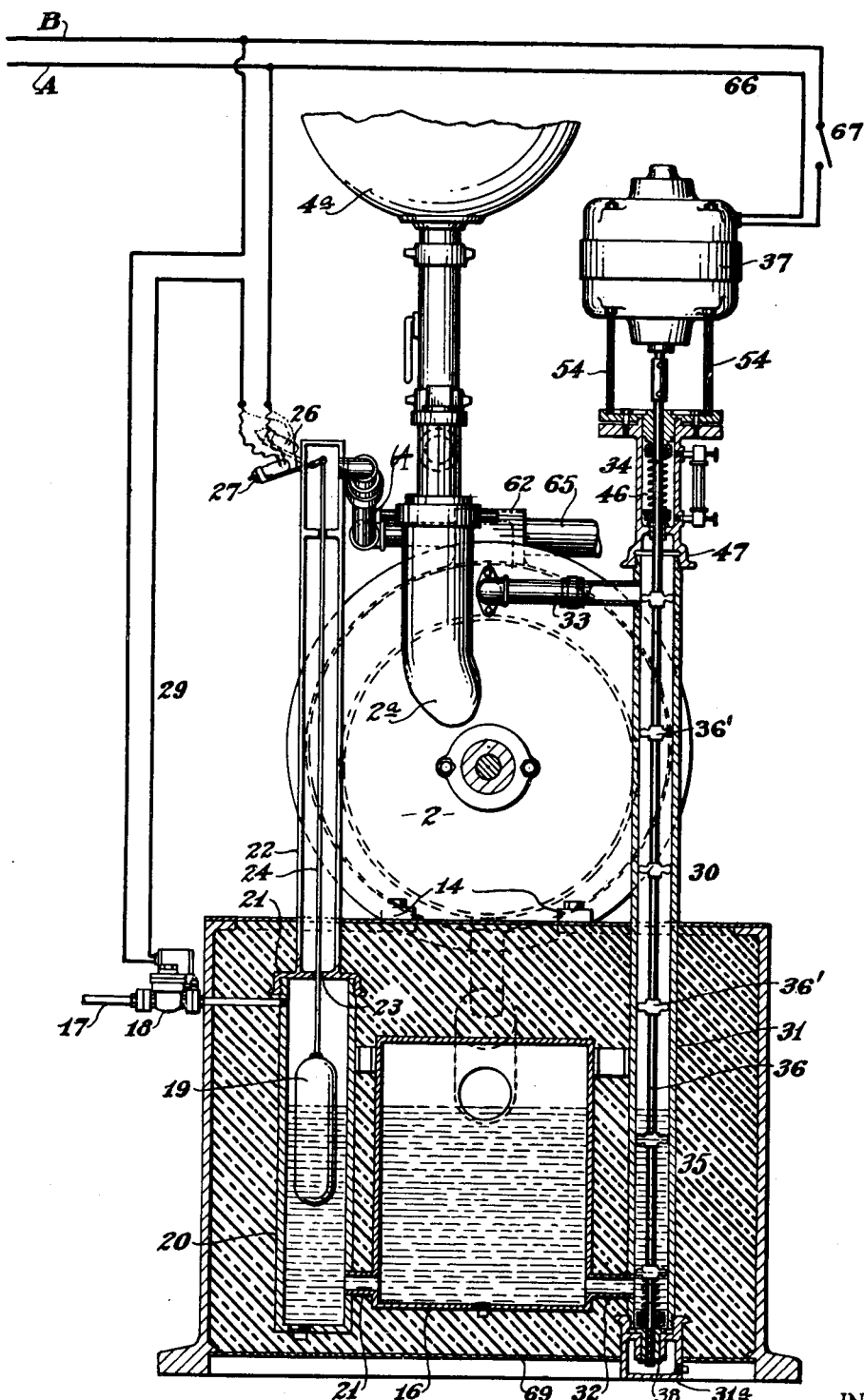
Fig. 3 is a section on the line 3—3 of Fig. 2.
Figure 7:
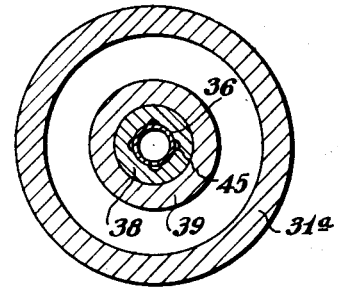
Fig. 7 is a section on the line 7—7 of Fig. 6.
Figure 6:
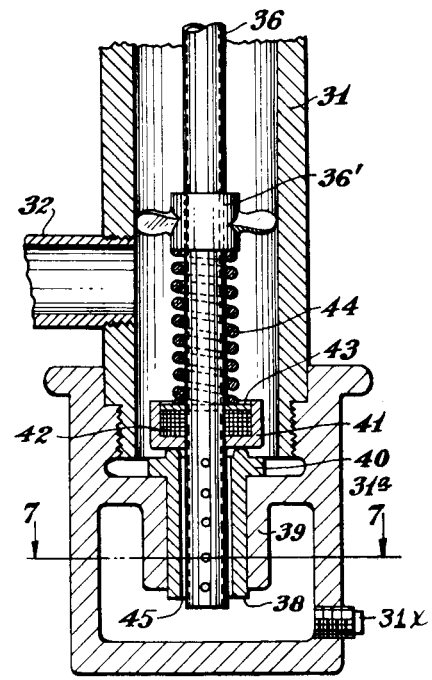
Figs. 5 and 6 are fragmentary sections of parts shown in Fig. 3, enlarged.
Figure 5:
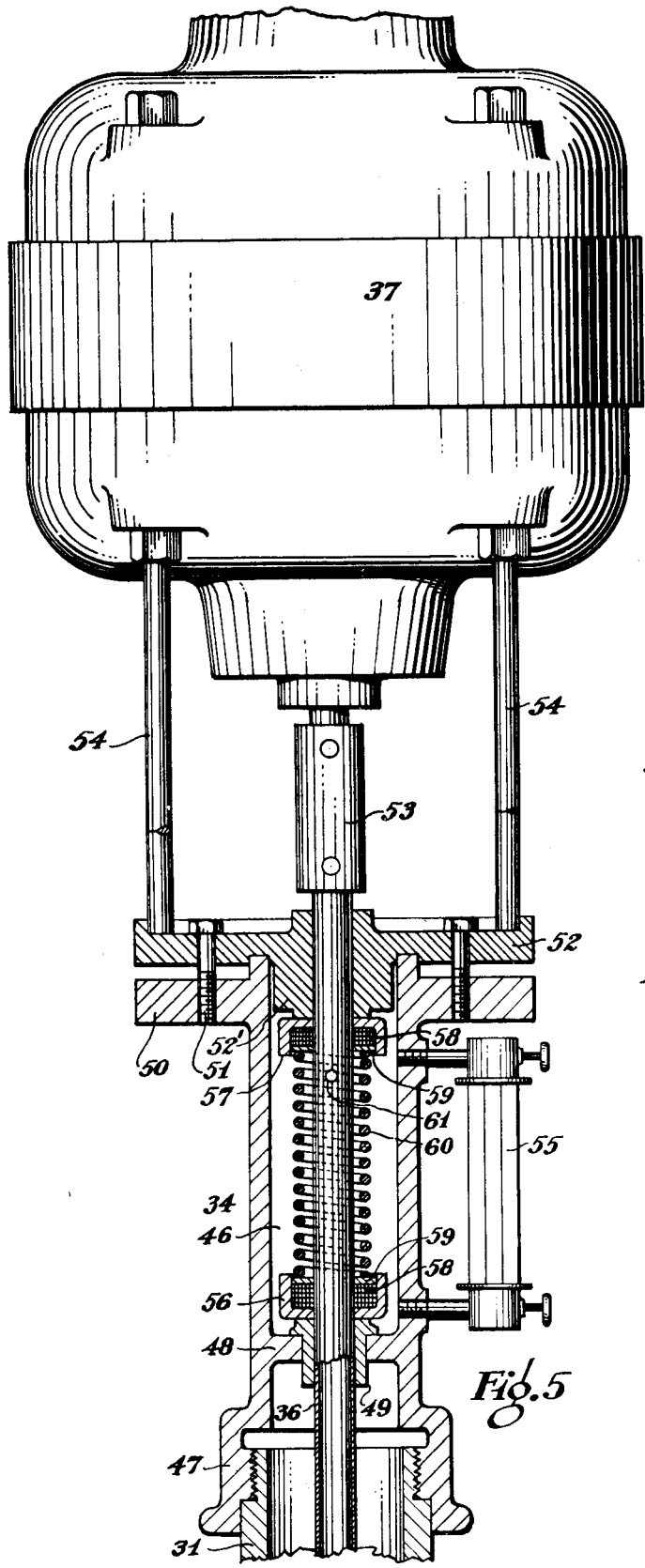

16 indicates a combined reservoir and receiver for the liquid ammonia. 17 indicates a pipe connected to the reservoir 16 and leading from a supply of liquid ammonia, to maintain a substantially predetermined quantity in the reservoir 16. The pipe 17 is provided with a valve 18, which is automatically controlled by a float 19 to replace the liquid ammonia which gasifies or is used up to effect cooling or freezing in the operation of the apparatus. The float 19 is preferably operable within a chamber 20 connected to but separate from the reservoir 16, so that the pumping of the ammonia from the reservoir and its gravitation thereinto will not directly affect the liquid ammonia level in the chamber 20 and thus cause abnormal operation of the float 19. The float chamber 20 is connected at its lower end to the lower end of the reservoir 16 by a pipe 21. The supply pipe 17 leads into the chamber 20 above the normal level of the ammonia therein. The chamber 20 is closed or sealed at its upper end by a cap 21 having a tubular extension 22 preferably leading to a point above the upper portion of the space 10. The tubular member is provided internally with a disk 23, preferably welded to the walls thereof, the disk and cap 21 being formed with aligned openings the walls of which form a guide for a rod 24 to which the float 19 is connected. The rod 24 is moved endwise by the rise and fall of the float 19 and its upper end is pivotally connected to a crank 25, fixed to a rock shaft suitably mounted in the wall of the tubular member 22 and extending therethrough. The outer end of the rock shaft carries an arm 26, which supports a mercury tube switch 27 having switch contacts at its inner end, so that when the arm 26 swings to the position shown in dotted lines in Fig. 3, an electric circuit 29 is closed.

The valve 18 is preferably of a magnetic type, the casing for the valve having a portion 18a enclosing a solenoid which is energized when the circuit 29 is closed by the mercury switch 27 and de-energized when the circuit is broken. So long as the level of the ammonia remains substantially normal, the float will maintain the mercury switch in the position shown in Fig. 3, with the circuit open. As the valve element of the valve is normally maintained closed by a spring in the valve casing, the supply of ammonia will be cut off, but upon the lowering of this level, the mercury switch 27 will be operated, and thus close the circuit, the effect of which will be to open the valve 18 and allow ammonia to flow into the chamber 20 until the float 19, in rising, breaks the circuit 29.

30 indicates a conduit leading from the bottom of the reservoir 16 to the distributor 11, being preferably detachably connected to the rear end of the latter. The conduit 30 comprises a vertical leg 31, closed at its lower end in a liquid tight manner by a casing 31a, a pipe 32 connected to the lower portion of the leg 31 and the reservoir 16 and a branch pipe 33 leading from the upper portion of the leg 31 and detachably connected to the rear end of the distributor 11, the branch pipe 33 preferably leading through the head 2 and ring 3'. The upper end of the leg 31 is closed by a tubular fitting indicated as an entirety at 34.

30' indicates a return conduit leading from the space 10 to the reservoir 16. The conduit 30' comprises (a) a vertical section 30a, preferably elongated in a direction longitudinally of the cylinder 1 and leading through the casing 13, insulation 12 and an opening formed in the lowest portion of the wall 9, and (b) an inclined section 30b, connected to the upper portion of the reservoir, whereby the liquid ammonia discharged onto the cylinder 1 and flowing around the walls thereof may freely gravitate into the reservoir 16. The section 30a may be welded or otherwise secured to the walls of the opening formed in the cylinder 9.

35 indicates as an entirety means for pumping or inducing a flow of the liquid ammonia from the reservoir 16 to and through the distributor 11. The pumping means preferably comprise the following elements: 36 indicates a shaft extending longitudinally through the leg 31 and tubular fitting 34 and connected to the shaft of an electric motor 37 mounted on the upper end of the fitting 34. The shaft 36 is hollow for a purpose later set forth. At spaced points along the shaft 36 within the leg 31 are provided a plurality of propelling elements 36', certain of which are arranged below the level of the ammonia in the leg 31. Each element 36' consists of a collar fixed to the shaft and radial blades oppositely inclined so that when the shaft 36 is driven in one direction the blades will elevate the ammonia and induce a flow thereof upwardly through the leg 31 and to and through the distributor 11. The lower end of the shaft 36 is mounted in a bushing 38 which fits into a collar 39 provided in the casing 31a above its bottom wall, the flange of the bushing engaging the upper surface of the collar. The upper end of the bushing 38 is provided with an annular rib 40 on which is yieldably supported a cup shaped member 41. The bottom of the member 41 is formed with an opening through which the shaft 36 extends. The member 41 around the shaft 36 is filled with packing 42 and the packing is covered with an annular plate 43, which is engaged by the lower end of a coiled spring 44, the upper end of the spring preferably engaging the collar of the adjacent propelling element 36'. The spring 44 is normally under tension to exert pressure through the plate 43 on the packing and to maintain the cup-shaped member 44 against the rib 40.

The internal wall of the bushing 38 is formed with one or more longitudinal oil grooves 45 to which oil flows through openings formed in the walls of the shaft, the oil being supplied from a supply chamber 46 as later set forth.

The fitting 34 is preferably of tubular shape and provided at its lower end with an enlarged collar 47 internally threaded for connection, in a gas and liquid tight manner to the upper end of the leg 31. Within the fitting 34 and above the collar 47, the fitting is provided with a transverse wall 48 formed with an opening in which fits a flanged bushing 49, the latter forming a bearing for the shaft 36. The upper end of the fitting 34 is provided with an external flange 50, to which is secured, by bolts 51, a circular plate 52, the bottom surface of the plate being formed with an annular groove to receive the annular end of the fitting to close and seal the upper end of the latter. The central portion of the plate 52 is preferably thickened to provide a suitable bearing 52' for the shaft 36, which extends through the plate for connection by a coupling 53 to the shaft of the motor 37. The motor 37 is rigidly supported on the plate 52 by a plurality of up-standing rods 54.

The space between the wall 48 and plate 52 constitutes the oil chamber 46, already referred to, the amount of oil in the chamber being indicated by a glass gage 55. Leakage of gas or liquid ammonia from the conduit 30 into and through the fitting is prevented by the following means: 56, 57, indicate cup-shaped members the bottoms thereof being formed with openings through which the shaft 36 extends. The bottom of the member 56 rests face to face on the upper end of the bushing 49 and the member 57 engages face to face with the lower surface of the bearing 52'. Each cup-shaped member 56, 57, around the shaft 36 is filled with packing 58 which is covered with an annular plate 59. 60 indicates an expansion spring coiled around the shaft and engaging the plates 59 and normally acting therethrough to compress the packing around the shaft and yieldably maintain the cup-shaped members against the bushing 49 and bearing 52'. The oil in the chamber 46 serves to lubricate the shaft as it rotates in the bushing 49 and bearing 52', and the cup shape members as they rotate. For this purpose, the convolutions of the spring are so arranged or wound with respect to the direction of rotation of the shaft 36, that they act as elevating means to deliver oil to the bearing 52' and sealing member 57. As a thin film of oil will be maintained between these members and the bushing 49 and bearing 52' and these members are yieldably maintained against the latter, a gas and oil seal results; and as the spring 60 normally acts to compress the packings in these members, danger of gas escaping around the shaft 36 is eliminated.

By preference one side wall of the shaft 36 is formed with an opening 61 in the upper portion of the chamber 46, that is, above the level of the lubricating oil therein. The purpose of this opening 61 is to permit a portion of the oil which is carried upwardly by the spring 60, due to its rotation with the shaft 36, to flow into the latter and gravitate therethrough to the opening or ports formed in the lower end of the shaft and flow into the grooves 45, to lubricate the adjacent bearing walls.

The casing 31a may be provided with a pet cock or plug 31x to drain out excess oil therein, either due to that supplied from the chamber 46 and/or otherwise accumulating in the system.

The distributor 11 comprises a pipe disposed in the space 10 above the cylinder 1 and extending substantially from end to end thereof. On its lower side and from end to end the distributor is formed with a plurality of discharge openings through which the liquid ammonia flows. By preference, I provide two longitudinal rows of openings each row being disposed at one side of a vertical plane cutting the axis of the pipe 11, to insure discharge of substantially equal amounts of liquid ammonia to either side of the cylinder 1, and thereby provide equal temperature changing effects on all portions of the latter.

It will be apparent that more than one distributor may be provided in the space 10 when found desirable.

The rear end of the distributor 11 is detachably connected to the inner end of the branch pipe 33, by a suitable coupling, to permit removal of the distributor.

62 indicates a hollow fitting secured in a gas and liquid tight manner to the walls of an opening 63 formed in the upper portion of the wall 9. From one side of the fitting 62 leads a relatively small pipe 64, which is connected to the tubular member 22 to provide a pressure equalizing connection between the space 10 and space above the ammonia level in the chamber 20 and reservoir 16, whereby such level due to the pumping of the ammonia to the distributor and flow thereof to the reservoir will not be affected. From the other side of the fitting 62 leads a relatively large pipe 65, connected to the suction side or intake of a compressor (not shown) to carry off all gas which may be generated in the system or space 10.

The motor 37 is connected to the supply mains A, B, by a circuit 66, controlled by a switch 67 of any desired construction.

Operation: in freezing a batch of "mix" the driving means 8 is started to set the agitating mechanism 6 in operation. Next, the measured quantity of the "mix" is introduced into the cylinder 1 through the inlet 2a. Next, the switch 67 is closed to start the motor 37. As soon as the motor 37 is operated, liquid ammonia is pumped to the distributor 11 from which it is sprayed or discharged onto the walls of the cylinder 1, over which the ammonia flows as it gravitates to the bottom of the space 10 and through the return conduit 30' to the reservoir 16, from which the ammonia may be again pumped or circulated to the distributor. The ammonia, while flowing over or around the cylinder, provides rapid heat transfer from the batch of "mix" in the cylinder 1 allowing the ammonia to carry the absorbed heat away in the form of gas to the compressor. The surplus or unused liquid ammonia gravitates to the bottom of the space 10 and through the return conduit 30', as above set forth. When the "mix" is frozen to the desired degree, the motor 37 is stopped. This operation instantly cuts off the flow of the ammonia to the distributor and that portion of the ammonia in the distributor and flowing over the walls of the cylinder immediately gravitates to the reservoir, thereby completely draining the space 10 of liquid ammonia; accordingly, refrigeration effect upon the batch of material ceases substantially instantly the motor 37 is stopped, thereby permitting the frozen "mix" to be whipped to the desired swell or over-run. The completed batch is then discharged into suitable receivers and a new batch of "mix" introduced into the cylinder 1. The switch 67 is then closed to set the motor 37 in operation, which substantially instantly supplies liquid ammonia to the distributor to effect flow thereof over the cylinder 1.

From the foregoing description it will be seen that a full supply of the liquid ammonia is substantially instantly applied to the entire exterior surface of the cylinder 1 when the motor 37 is started, and when the motor 37 is stopped the entire application of the ammonia thereto substantially instantly ceases. This permits positive control of the refrigeration and tends to speed the operations of freezing and whipping successive batches of the "mix". Also, as the liquid ammonia is discharged above the cylinder 1 and flows downwardly thereover, it continuously washes the walls of the latter so that any and all gas that may form in pockets between these walls and the liquid flowing downwardly is dislodged from these walls and separated from the liquid flowing downwardly, the effect of which is to insure uniform refrigeration effects over the entire cylinder. Since the scrapers 7 have a revolving speed of approximately 175 revolutions per minute, it will be seen that a very thin film of material is allowed to adhere to the interior of the inner surface of the cylinder 1 between adjacent scrapers as they traverse the cylinder wall before the next, rearward scraper engages therewith to remove it. Accordingly, the uniform application of the liquid ammonia to the exterior surface of the cylinder in conjunction with the operation of the scrapers is advantageous to insure a uniform, smooth frozen consistency of the "mix" wherein the ice crystals are finely and uniformly divided.

To provide against frosting and condensation on exposed walls, the receiver 16, chamber 20, conduit 30' and that portion of the conduit 30 within the base 8b are suitably insulated as shown at 68. The bottom of the base 8b is preferably closed by a removable plate 69.

My construction is advantageous for the reason that discharge of the liquid ammonia from the space 10 is not dependent upon the generation of gas therein to expel the liquid ammonia or by operation of one or more valves, but it permits the liquid ammonia to at all times gravitate on, drain from the space 10 so that danger of explosions, due to injection of hot water or steam into the container, is entirely eliminated. In my construction of apparatus the liquid ammonia is applied to the container mechanically and gravitates thereover, as contradistinguished from a thermal or flooded system, for which reason the construction is relatively simple, the heat transfer is effectively and positively controlled to insure rapid, as well as uniform cooling or freezing. In such construction and method of operation, it will be noted that the chamber 10 is directly connected to the intake side of the compressor and upper portion of the reservoir, so that generated gases may be carried off; also, that no valves are required to be operated to effect complete freezing of each batch or the freezing of successive batches; also, since the liquid ammonia always flows through the chamber 10 in one direction and does not surge into and out thereof, its supply and cut-off are positively controlled and time is saved in carrying out the successive steps in freezing each batch, as well as applying the liquid ammonia to each new batch to be frozen.

By arranging the cylinders 1 and 9 eccentrically and disposing the eccentric radius of the latter in the position shown, an adequate sized gas collection and separation chamber is readily provided above the down-flowing liquid, so that danger of liquid being carried into the suction pipe 65 is minimized.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In apparatus of the class described, the combination of a closed container, a casing surrounding said container in spaced relation thereto, a reservoir for a liquid refrigerant having a relatively low boiling point arranged below said casing, an exhaust pipe for gases leading from the upper portion of said casing, a discharge conduit leading from the lower portion of said casing and connected to said reservoir, means for supplying the refrigerant from said reservoir into the space between said casing and container above the latter, and permitting the refrigerant to flow over the walls of said container, and means for shutting off the refrigerant supply means.

2. In apparatus of the class described, the combination of a closed container, a casing surrounding said container in spaced relation thereto, a reservoir for liquid refrigerant having a relatively low boiling point below said container and arranged to receive the refrigerant after flowing thereover, an exhaust pipe for gases leading from the upper portion of said casing, means for conveying liquid refrigerant from said reservoir to the space between said container and casing and discharging it onto the upper walls of said container, to permit the refrigerant to flow downwardly over the walls thereof, the walls of said casing and container being shaped and arranged to form an enlarged space between their upper portions to insure separation of the evolved gases from the downwardly flowing liquid, and means for controlling the operation of said conveying means.

3. In apparatus of the class described, the combination of a container, a casing surrounding said container in spaced relation thereto, an exhaust pipe for the gases leading from the upper portion of said casing, a reservoir for a liquid refrigerant having a relatively low boiling point arranged below said casing, a distributor in the space between said casing and container, above the latter, and extending substantially from end to end thereof, a discharge conduit leading from the lower portion of said casing and connected to said reservoir, means for conveying the refrigerant from said reservoir to said distributor, whereby the refrigerant may flow over the walls of said container, and means for stopping the flow of the refrigerant.

4. In apparatus of the class described, the combination of a container, a casing surrounding said container in spaced relation thereto, an exhaust pipe for gases leading from the upper portion of said casing, a reservoir for a liquid refrigerant having a relatively low boiling point arranged below said casing, a distributor in the space between said casing and container, above the latter, and extending substantially from end to end thereof, said distributor comprising a conduit formed with discharge ports, a discharge conduit leading from the lower portion of said casing and connected to said reservoir, means for conveying the refrigerant from said reservoir to said distributor, whereby the refrigerant may flow over the wall of said container, and means for stopping the flow of the refrigerant.

5. In apparatus of the class described, the combination of a container, a casing surrounding said container in spaced relation thereto, a distributor in the space between said casing and container, above the latter, extending substantially from end to end thereof, a reservoir for a liquid refrigerant, a conduit leading from the lower portion of said casing to said reservoir, means for conveying liquid refrigerant from said reservoir to said distributor, and a separate conduit between the upper portion of said casing and said reservoir.

6. In apparatus of the class described, the combination of a container, a casing surrounding said container in spaced relation thereto, a distributor in the space between said casing and container, above the latter, and extending substantially from end to end thereof, a reservoir for a liquid refrigerant, a conduit leading from the lower portion of said casing to said reservoir, means for conveying liquid refrigerant from said reservoir to said distributor, a chamber having connection with said reservoir, a valve controlled supply pipe connected with said chamber and leading from a source of supply, a float in said chamber operatively connected with the valve in said pipe, and a conduit between the upper portion of said casing and said chamber.

7. In apparatus of the class described, the combination of a closed container, a casing surrounding said container in spaced relation thereto, an exhaust pipe for gases leading from the upper portion of said casing, a reservoir for a liquid refrigerant having a relatively low boiling point arranged below said casing, a discharge conduit leading from the lower portion of said casing and connected to said reservoir, means for conveying the refrigerant from said reservoir into the space between said casing and container above the latter, to permit the refrigerant to flow downwardly over the walls of said container, said means comprising a conduit having a leg, a shaft mounted in said leg and extending through one wall thereof, elements on said shaft for propelling the refrigerant through said leg, and sealing means surrounding said shaft adjacent the wall through which it extends for preventing the escape of the liquid refrigerant or gases evolved therefrom.

8. In apparatus of the class described, the combination of a closed container, a casing surrounding said container in spaced relation thereto, an exhaust pipe for gases leading from the upper portion of said casing, a reservoir for liquid refrigerant having a relatively low boiling point arranged below said casing, a discharge conduit leading from the lower portion of said casing to said reservoir, and means for conveying liquid refrigerant from said reservoir to the space between said container and casing and discharging it onto the upper walls of said container, to permit the refrigerant to flow downwardly over the walls of said container, said means comprising a conduit having a vertical leg, a fitting on the upper end of said leg having a bearing and mechanism in said leg for propelling the liquid refrigerant through said conduit, said mechanism including a driven shaft extending through said fitting and mounted in the bearing therein and means for sealing said bearing.

9. In apparatus of the class described, the combination of a closed container, a casing surrounding said container in spaced relation thereto, an exhaust pipe for gases leading from the upper portion of said casing, a reservoir for liquid refrigerant having a relatively low boiling point arranged below said casing, a discharge conduit leading from the lower portion of said casing to said reservoir, and means for conveying liquid refrigerant from said reservoir to the space between said container and casing and discharging it onto the upper walls of said container, to permit the refrigerant to flow downwardly over the walls of said container, said means comprising a conduit having a vertical leg, a bearing within and at the lower end of said leg, a fitting at the upper end of said leg and provided with a bearing and mechanism in said leg for propelling the liquid refrigerant through said conduit, said mechanism including a driven shaft mounted in said bearings and means for sealing each of said bearings.

10. In apparatus of the class described, the combination of a closed container, a casing surrounding said container in spaced relation thereto, a reservoir for liquid refrigerant below said casing, a discharge conduit leading from the lower portion of said casing to said reservoir, and means for conveying liquid refrigerant from said reservoir to the space between said container and casing and discharging it onto the upper walls of said container, said means comprising a conduit having a vertical leg, a bearing within and at the lower end of said leg, a tubular fitting at and arranged to close the upper end of said leg and provided with a bearing and mechanism in said leg for inducing a flow of the liquid refrigerant through said conduit, said mechanism including a hollow driven shaft mounted in said bearings, the tubular fitting being adapted to hold lubricant and said shaft having an opening in its wall in the fitting and an opening in its wall leading to the first mentioned bearing to permit oil to flow from the fitting to the said bearing.

11. In apparatus of the class described, the combination of a horizontal, closed container having a material inlet and a valve controlled material outlet, a casing surrounding said container in spaced relation thereto and closed at its opposite ends, a reservoir for a liquid refrigerant below said casing, a pipe for supplying refrigerant to said reservoir, a valve in said pipe, means for controlling the operation of said valve, said controlling means including a float in said reservoir and operated by the rise and fall of the liquid level therein, whereby a substantially predetermined supply of refrigerant is maintained in said reservoir, a pipe in the space between said casing and container, above the latter and extending from end to end thereof and formed with discharge ports for distributing the refrigerant onto the walls of said container, to permit the refrigerant to flow downwardly over the walls thereof, means for conveying refrigerant from said reservoir to said pipe, and a pipe leading from the upper portion of said casing to said reservoir.

12. In apparatus of the class described, the combination of a container, a casing surrounding said container in spaced relation thereto, means in the space between said casing and container, above the latter, for distributing liquid refrigerant onto said container, a reservoir for a liquid refrigerant, a conduit leading from the lower portion of said casing to said reservoir, means for conveying liquid refrigerant from said reservoir to said distributing means, and a separate conduit between the upper portion of said casing and said reservoir.

13. In apparatus of the class described, the combination of a horizontally disposed cylinder normally closed at its ends, a casing surrounding said cylinder in spaced relation thereto to form an annular circulating chamber, walls for closing said chamber at its opposite ends, a reservoir for liquid refrigerant having a relatively low boiling point arranged below said casing, a pipe extending from end to end of said chamber between the upper portions of said cylinder and casing and formed with discharge ports for distributing the liquid refrigerant onto said container, and allowing the refrigerant to flow over the walls of said cylinder, a conduit leading from the lower portion of said casing to said reservoir, means for conveying liquid refrigerant from said reservoir to said distributing means, and a suction pipe connected to the upper portion of said casing.

14. In apparatus of the class described, the combination of a container, a casing surrounding said container in spaced relation thereto, means in the space between said casing and container, above the latter, for distributing liquid refrigerant onto said container, a reservoir for a liquid refrigerant, a conduit leading from the lower portion of said casing to said reservoir, means for conveying liquid refrigerant from said reservoir to said distributing means, a suction pipe connected to the upper portion of said casing, and a separate conduit between the upper portion of said casing and said reservoir.

15. In apparatus of the class described, the combination of a horizontally disposed container, a closed casing surrounding said container to form a chamber into which liquid refrigerant having a relatively low boiling point is supplied for gravitation over the walls of said container, the walls of said container and casing being related to form within the upper portion of the latter an enlarged space to permit separation of generated gases and liquid, an exhaust pipe leading from the upper portion of said casing, means for supplying liquid refrigerant into the chamber between said casing and container above the latter, and a discharge conduit leading from the lower portion of said casing.

16. The herein disclosed process of cooling material in a container enclosed in a gas tight chamber, which consists in continuously supplying liquid refrigerant having a relatively low boiling point into said chamber above the container and causing downward flow of the refrigerant over the walls thereof and preventing formation of gas pockets on said walls while permitting the separation of gases from the liquid, discharging the unused liquid into a receiver, and conveying away the generated gases.

17. In apparatus of the class described, the combination of a closed container, a casing surrounding said container in spaced relation thereto, a reservoir for liquid refrigerant below said casing, a discharge conduit leading from the lower portion of said casing to said reservoir, means for conveying liquid refrigerant from said reservoir to the space between said container and casing and discharging it onto the upper walls of said container, a pipe for supplying the liquid refrigerant to said reservoir, a valve in said pipe outside the walls of said reservoir, a float operated by the rise and fall of the refrigerant level in said reservoir, and operating connections between said float and said valve for operating the latter.

18. In apparatus of the class described, the combination of a horizontally disposed cylinder having an inlet and a valve controlled outlet, a casing closed at its ends and surrounding said cylinder in spaced eccentric relation thereto, to form a chamber around said cylinder having an enlarged portion above it, a hollow base for supporting said cylinder and casing, a reservoir in said base for holding liquid refrigerant, means for conveying the liquid refrigerant from said reservoir into the said chamber and discharging it onto the upper walls of said cylinder, an outlet leading from the lower portion of said chamber through said base to said reservoir, and means for insulating said reservoir and outlet.

19. In apparatus of the class described, the combination of a closed cylinder for holding material to be refrigerated and a surrounding cylindrical casing closed at its ends, said cylinder and said casing being spaced and disposed in eccentric relation to form a space progressively enlarged upwardly, said space forming means for circulating a volatile liquid refrigerant over the walls of the holding cylinder and effect washing therefrom of pockets of gas generated on the walls of said cylinder, and providing for the gravitational separation of the gas from the liquid refrigerant during circulation of the latter, a connection for liquid refrigerant leading through the wall of said casing, and an outlet for gas formed in the wall of said casing.

20. In apparatus of the class described, the combination of a closed cylinder for holding material to be refrigerated and a surrounding cylindrical casing closed at its ends, said cylinder and said casing being spaced and disposed in eccentric relation to form a space progressively enlarged upwardly, said space forming means for circulating a volatile liquid refrigerant over the walls of the holding cylinder and effect washing therefrom of pockets of gas generated on the walls of said cylinder and providing for the gravitational separation of the gas from the liquid refrigerant during circulation of the latter, a distributor in the upper portion of said circulation space, means for supplying the liquid refrigerant to said distributor, and an outlet for gas formed in the wall of said casing.

21. In apparatus of the class described, the combination of a cylinder for holding material to be refrigerated, closed at its ends and having an inlet and an outlet, agitating means in said cylinder, a wall surrounding said material holding cylinder in spaced relation thereto, the space between said wall at its ends and said cylinder being closed whereby said wall and cylinder form a flow chamber for a liquid refrigerant having a low boiling point, said surrounding wall and said cylinder being arranged to enlarge the flow chamber above said cylinder to permit rapid separation of the liquid refrigerant and gases, circulation means for the refrigerant having a reservoir, a supply connection leading from said reservoir to the enlarged portion of said chamber and a discharge connection leading from the lower portion of said chamber to said reservoir, said circulation means including mechanical means in one of said connections for circulating the refrigerant therethrough, and a suction outlet for gases leading from said chamber.

22. In apparatus of the class described, the combination of a cylinder for holding material to be refrigerated, closed at its ends and having an inlet and an outlet, agitating means in said cylinder, a wall surrounding said material holding cylinder in spaced relation thereto, the space between said wall at its ends and said cylinder being closed whereby said wall and cylinder form a flow chamber for a liquid refrigerant having a low boiling point, said surrounding wall and said cylinder being arranged to enlarge the flow chamber above said cylinder to permit rapid separation of the liquid refrigerant and gases, distributing means in the enlarged portion of said chamber and arranged to direct the refrigerant into contact with the walls of said cylinder, whereby the refrigerant may flow over said cylinder walls, circulation means for the refrigerant having a reservoir, a supply connection leading from said reservoir to said distributing means and a discharge connection leading from the lower portion of said chamber to said reservoir, said circulation means including mechanical means for circulating the refrigerant, and a suction outlet for gases leading from said chamber.

23. In apparatus of the class described, the combination of a cylinder for holding material to be refrigerated, closed at its ends and having an inlet and an outlet, agitating means in said cylinder, a wall surrounding said material holding cylinder in spaced relation thereto, the space between said wall at its ends and said cylinder being closed whereby said wall and cylinder form a flow chamber for a liquid refrigerant having a low boiling point, said surrounding wall and said cylinder being arranged to enlarge the flow chamber above said cylinder longitudinally of the latter to permit rapid separation of the liquid refrigerant and gases, means in and extending longitudinally of the enlarged portion of said chamber and arranged to discharge the refrigerant into direct contact with the walls of said cylinder, whereby the refrigerant may flow over said cylinder walls, circulation means for the refrigerant having a reservoir, a supply connection leading from said reservoir to said discharging means and a discharge connection leading from the lower portion of said chamber to said reservoir, said circulation means including means for circulating the refrigerant, and a suction outlet for gases leading from said chamber.

24. In apparatus of the class described, the combination of a cylinder for holding material to be refrigerated, closed at its ends and having an inlet and an outlet, agitating means in said cylinder, a wall surrounding said material holding cylinder in spaced relation thereto, the space between said wall at its ends and said cylinder being closed whereby said wall and cylinder form a flow chamber for a liquid refrigerant having a low boiling point, distributing means in said chamber above said cylinder for the liquid refrigerant and arranged to direct the refrigerant into contact with the wall of said cylinder, said distributing means comprising a conduit extending longitudinally of said cylinder and formed with openings through which the liquid refrigerant flows whereby the refrigerant may flow over said cylinder wall, circulation means for the refrigerant having a reservoir, a supply connection leading from said reservoir to said distributing means and a discharge connection leading from the lower portion of said chamber to said reservoir, said circulation means including means for circulating the refrigerant, and a suction outlet for gases leading from said chamber.

25. The herein disclosed process of refrigerating material during agitation thereof in a container surrounded by a closed chamber having a discharge opening which consists in agitating the material and simultaneously supplying a liquid refrigerant having a relatively low boiling point into the upper portion of said chamber and circulating it under pressure over and in contact with the walls of the container and discharging the unused portion of the refrigerant through said opening and utilizing the circulation of the refrigerant to remove from the container walls gases generated by the transfer of heat from the material and simultaneously exhausting from the upper portion of the chamber the generated gases which become separated from the liquid refrigerant.

26. The herein disclosed process of refrigerating material in a container surrounded by a closed chamber having a discharge opening, which consists in supplying a liquid refrigerant having a relatively low boiling point into the upper portion of said chamber and circulating it under pressure over and in contact with the walls of the container and discharging the unused portion of the refrigerant through said opening and utilizing the circulation of the refrigerant to remove from the container walls gases generated by the transfer of heat from the material and simultaneously exhausting from the upper portion of the chamber the generated gases which become separated from the liquid refrigerant.

27. The herein disclosed process of refrigerating material during agitation thereof in a container surrounded by a closed chamber, which consists in supplying a liquid refrigerant having a relatively low boiling point into the upper portion of said chamber and circulating it over and in contact with the walls of the container, collecting the unused portion of the refrigerant for re-circulating it over and in contact with the cylinder walls and utilizing the circulation of the liquid refrigerant to remove from the container walls gases generated from the transfer of heat from the material and simultaneously exhausting from the upper portion of the chamber the generated gases which become separated from the liquid, and then shutting off the supply of the liquid refrigerant and continuing the agitation of the material to effect whipping thereof.

28. The herein disclosed process of refrigerating material during agitation thereof in a container surrounded by a closed chamber, which consists in supplying a liquid refrigerant having a relatively low boiling point into said chamber and circulating it over and in contact with the walls of the container, utilizing the circulation of the liquid over the container walls to remove therefrom gases generated by the transfer of heat from the material and simultaneously permitting the liquid and gases to separate and exhausting from the upper portion of the chamber the generated gases which become separated from the liquid.

29. In apparatus of the class described, the combination of an evaporator for holding material from which heat is to be extracted, a closed casing surrounding and in spaced relation to the walls of said evaporator and cooperating therewith to form a separator for gas, an outlet leading from the upper portion of said casing, and circulation means for a volatile liquid refrigerant including a source of refrigerant supply, a distributor above said evaporator in the space between it and said casing for directing the refrigerant onto the evaporator walls, and means for conveying the refrigerant from said source of supply to said distributor.

MICHAEL HENRY ACKERMAN.